(12) United States Patent
Konishi et al.

(10) Patent No.: US 12,161,137 B2
(45) Date of Patent: Dec. 10, 2024

(54) POWDERY FOOD CONTAINING STARCH-CONTAINING PLANT-DERIVED POWDER

(71) Applicant: MIZKAN HOLDINGS CO., LTD., Aichi (JP)

(72) Inventors: Manabu Konishi, Aichi (JP); Junichiro Ihara, Aichi (JP)

(73) Assignee: Mizkan Holdings Co., Ltd., Aichi (JP)

( * ) Notice: Subject to any disclaimer, the term of this patent is extended or adjusted under 35 U.S.C. 154(b) by 702 days.

(21) Appl. No.: 17/336,886

(22) Filed: Jun. 2, 2021

(65) Prior Publication Data

US 2021/0282438 A1 Sep. 16, 2021

Related U.S. Application Data

(63) Continuation of application No. PCT/JP2019/045277, filed on Nov. 19, 2019.

(30) Foreign Application Priority Data

Apr. 11, 2019 (JP) ................................ 2019-075647

(51) Int. Cl.
| | |
|---|---|
| A23L 19/15 | (2016.01) |
| A23L 2/52 | (2006.01) |
| A23L 5/30 | (2016.01) |
| A23L 19/10 | (2016.01) |
| A23L 29/00 | (2016.01) |
| A23L 33/125 | (2016.01) |
| A23L 33/21 | (2016.01) |
| A23P 10/40 | (2016.01) |

(52) U.S. Cl.
CPC .............. *A23L 19/15* (2016.08); *A23L 2/52* (2013.01); *A23L 5/32* (2016.08); *A23L 19/105* (2016.08); *A23L 29/035* (2016.08); *A23L 33/125* (2016.08); *A23L 33/21* (2016.08); *A23P 10/40* (2016.08)

(58) Field of Classification Search
CPC .......... A23L 3/349; A23L 7/198; A23L 19/15; A23L 2/52; A23L 5/32; A23L 29/035; A21D 2/14; A21D 6/008; A23P 10/40
See application file for complete search history.

(56) References Cited

U.S. PATENT DOCUMENTS

| 6,068,873 A * | 5/2000 | Delrue | A23L 7/198 |
| | | | 426/504 |
| 2013/0136845 A1* | 5/2013 | Hoffman | A23D 9/02 |
| | | | 426/622 |

| 2016/0015064 A1 | 1/2016 | Luo et al. |
| 2017/0119032 A1 | 5/2017 | Patron et al. |
| 2021/0227863 A1 | 7/2021 | Patron et al. |

FOREIGN PATENT DOCUMENTS

| CN | 106174504 A | * 12/2016 |
| CN | 108473528 A | 8/2018 |
| JP | H05268890 A | 10/1993 |
| JP | H07298849 A | 11/1995 |
| JP | 2002034471 A | 2/2002 |
| JP | 2010004866 A | 1/2010 |
| JP | 201334411 A | 2/2013 |
| JP | 6412297 B1 | 10/2018 |
| KR | 100838250 B1 | 6/2008 |
| WO | 2017189778 A1 | 11/2017 |

OTHER PUBLICATIONS

CN 106174504 A (Clarivate machine translation) (Year: 2016).*
The Good Scents Company et al. "2,3-butane diol 513-85-9", Dec. 4, 2017, pp. 1-19, XP055855318, Retrieved from the Internet :URL:https://web.archive.org/web/20171204135059/http://www.thegoodscentscompany.com/data/rw1161171.html [retreived on Oct. 26, 2021] (2 pages).
R. G. Buttery et al. "Studies on Flavor Volatiles of Some Sweet Corn Products", Journal of Agricultural and Food Chemistry, vol. 42, No. 3, Mar. 1, 1994, pp. 791-795 (5 pages).
European Search Report (ESR) issued on Nov. 11, 2021 for European Patent Application No. 19924523.4 (6 pages).
International Search Report issued in corresponding International Application No. PCT/JP2019/045277; mailed Feb. 10, 2020 (2 pages).
Written Opinion of the International Searching Authority issued in corresponding International Application No. PCT/JP2019/045277; dated Feb. 10, 2020 (4 pages).

* cited by examiner

*Primary Examiner* — Elizabeth Gwartney
*Assistant Examiner* — Andrew E Merriam
(74) *Attorney, Agent, or Firm* — Osha Bergman Watanabe & Burton LLP

(57) ABSTRACT

A method for easily controlling the smell of dried starch and bringing out a sweet starch flavor characteristic of a plant in a powdery food containing a powder derived from a starch-containing plant is provided. A powdery food comprises a powder derived from a starch-containing plant. The powdery food has a starch content of 10 mass % or more in terms of dry mass, a dietary fiber content of 1 mass % or more in terms of dry mass, a particle size d50 of 1,000 μm or less after ultrasonication, and a 2,3-butanediol content of 50 ppb or more and 40,000 ppb or less and/or a diethylene glycol monoethyl ether content of 5 ppb or more and 40,000 ppb or less.

11 Claims, No Drawings

POWDERY FOOD CONTAINING STARCH-CONTAINING PLANT-DERIVED POWDER

TECHNICAL FIELD

One or more embodiments of the present invention relate to a powdery food containing starch-containing plant derived powder having enhanced sweet flavor and a method for the manufacture thereof, and a method for enhancing the sweet flavor of a powdery food containing starch-containing plant-derived powder.

BACKGROUND

A starch-containing plant-derived powder is a product of drying treatment of a starch-containing plant, in which a plant containing starch is dried by a pulverization step such as cutting or grating, and a drying step such as spray drying or freeze drying. Therefore, by denaturing starch in vegetables by a reaction or an oxidation reaction by an endogenous enzyme, a sweet aroma derived from starch is impaired, and a dry odor of starch is generated, and a flavor thereof is inferior to a raw state.

Regarding the above, Patent Literature 1 discloses a technique for improving grain taste and odor or glue taste and odor of cereals or starch processed foods.

In addition, Patent Literature 2 discloses a method of freeze-drying a precipitate obtained by subjecting vegetables to a grinding treatment in the presence of an aqueous medium and then subjecting the precipitate to a solid-liquid separation treatment as a means for suppressing flavor deterioration in a drying step of vegetables.

PATENT LITERATURES

Patent Literature 1: JP 2002-34471
Patent Literature 2: JP hei 07-298849

However, the product which exerts the effect according to Patent Literature 1 is an extract derived from sweet sucrose, which needs to be a fraction obtained by adsorbing the extract on a synthetic adsorbent column and then eluting it with at least one among water and alcohol. A complicated operation is required for preparation thereof, and a substance which exhibits an effect is not specified, and therefore, it is difficult to control the raw material and the added amount thereof. Further, the method described in Patent Literature 2 involves a burdensome process and requires a large device for processing a large amount of vegetables, and in addition, that the flavor deterioration preventing effect is not necessarily sufficient as a result of unavoidable contact with air.

SUMMARY

One or more embodiments of the present invention aim to provide a means to easily control the dry odor of starch and to bring out the sweet flavor peculiar to starch in a powdery food derived from a starch-containing plant.

As a result of energetic studies in view of the above circumstances, the present inventors found that the above can be easily solved at the same time by containing a specific amount of a specific compound and also adjusting the particle diameter of a powdery food containing a powder derived from a starch-containing plant to a constant value or less, thereby completing one or more embodiments of the present invention.

One or more embodiments of the present invention provide the following inventions [1] to [12].

[1] A powdery food comprising a powder derived from a starch-containing plant, the powdery food satisfying following characteristics (1) to (4):
  (1) the powdery food has a starch content of 10 mass % or more in terms of dry mass;
  (2) the powdery food has a dietary fiber content of 1 mass % or more in terms of dry mass;
  (3) the powdery food has a particle size d50 of 1,000 μm or less after ultrasonication; and
  (4) the powdery food has a 2,3-butanediol content of 50 ppb or more and 40,000 ppb or less and/or a diethylene glycol monoethyl ether content of 5 ppb or more and 40,000 ppb or less.
[2] The powdery food according to [1], comprising both 2,3-butanediol and diethylene glycol monoethyl ether.
[3] The powdery food according to [1] or [2], wherein the powdery food has a content of the powder derived from a starch-containing plant of 10 mass % or more with respect to the whole of the powdery food.
[4] The powdery food according to any one of [1] to [3], wherein the powdery food has a content of starch derived from the powder derived from a starch-containing plant of 50 mass % or more with respect to the whole of the powdery food.
[5] The powdery food according to any one of [1] to [4], wherein the starch-containing plant is one or more selected from the group consisting of grains, potatoes, pulses, nuts, vegetables, fruits, and mushrooms.
[6] The powdery food according to any one of [1] to [5], wherein the starch-containing plant is one or more selected from the group consisting of corn, pumpkin, sweet potato, and lotus root.
[7] A food/drink comprising the powdery food according to any one of [1] to [6].
[8] A method for manufacturing the powdery food according to any one of [1] to [6], the method comprising a step of crushing a starch-containing dried plant having a moisture content of 20 mass % or less.
[9] A method for manufacturing a powdery food having a particle size d50 of 1,000 μm or less after ultrasonication, the method comprising crushing a dried plant having a starch content of 10 mass % or more in terms of dry mass and a dietary fiber content of 1 mass % or more in terms of dry mass and allowing the powdery food to contain 50 ppb or more and 40,000 ppb or less of 2,3-butanediol and/or 5 ppb or more and 40,000 ppb or less of diethylene glycol monoethyl ether.
[10] A method for manufacturing a food/drink containing a powdery food having a particle size d50 of 1,000 μm or less after ultrasonication, the method comprising crushing an edible plant having a starch content of 10 mass % or more in terms of dry mass and a dietary fiber content of 1 mass % or more in terms of dry mass and allowing the powdery food to contain 50 ppb or more and 40,000 ppb or less of 2,3-butanediol and/or 5 ppb or more and 40,000 ppb or less of diethylene glycol monoethyl ether.
[11] A method for enhancing sweet flavor of starch in a powdery food having a particle size d50 of 1,000 μm or less after ultrasonication or a food/drink containing the powdery food, the method comprising adding 50 ppb or more and 40,000 ppb or less of 2,3-butanediol and/or 5 ppb or more and 40,000 ppb or less of diethylene glycol monoethyl ether to a dried and crushed product of a starch-containing plant having a starch content of 10 mass % or more in terms of dry mass and a dietary fiber content of 1 mass % or more in terms of dry mass.

[12] The method according to any one of [9] to [11], allowing the powdery food to contain both 2,3-butanediol and diethylene glycol monoethyl ether.

According to one or more embodiments of the present invention, it is possible to provide a means for easily controlling the dry odor of starch and extracting the sweet flavor peculiar to starch in a powdery food containing a powder derived from a starch-containing plant.

DETAILED DESCRIPTION OF THE EMBODIMENTS

Hereinafter, examples of one or more embodiments of the present invention will be described, but one or more embodiments of the present invention are not limited to theses embodiments, and can be implemented with any modification without departing from the gist thereof.

The starch-containing plant in one or more embodiments of the present invention refers to a plant that contains starch and is eaten or drunk by human, and may be an edible plant having a starch content of 10 mass % or more in a dry state. The starch-containing plant may contain both the edible part and the inedible part.

The plant in one or more embodiments of the present invention may be any plant that is eaten or drunk by human and is not limited in any way, and examples thereof include vegetables, potatoes, mushrooms, fruits, algae, grains, nuts, and pulses. Among these plants, vegetables, potatoes, mushrooms, fruits, algae, grains, nuts, and pulses, which inherently contain sweet components, are more preferable, and vegetables, potatoes, mushrooms, fruits, nuts, grains, and pulses are further preferable. Specifically, it is possible to understand which food corresponds to the edible plant in one or more embodiments of the present invention by, for example, referring to grains, potatoes, pulses, nuts, vegetables, fruits, mushrooms, algae, and spices in the classification described in "the Standard Tables of Food Composition in Japan, 2015, (Seventh Revised Version) Supplement, 2018" (see the Food composition tables provided by the Ministry of Health, Labor and Welfare, in particular, Table 1 on page 236). These edible plants may be used alone or in an arbitrary combination of two or more thereof. These edible plants may be directly used or may be used after various treatments (e.g., drying, heating, harshness removal, peeling, seed removal, ripening, salting, and pericarp processing). The classification of an edible plant can be determined based on the state of the whole plant including the inedible part. The site and the proportion of the inedible part can be naturally understood by those skilled in the art who handle the food or processed food products. For example, the "disposal part" and the "wastage rate" described in the Standard Tables of Food Composition in Japan, 2015, (Seventh Revised Version) can be referred to and considered as the site and the proportion of the inedible part, respectively. The site and the proportion of the edible part can also be understood from the site and the proportion of the inedible part in an edible plant. The edible part and/or the inedible part thereof may be used in an arbitrary combination.

A powder derived from the starch-containing plant of one or more embodiments of the present invention may be prepared by subjecting the above-mentioned various edible plants to drying and crushing. As the drying method, an arbitrary method that is generally used in drying of foods can be used. Examples thereof include sun drying, shade drying, freeze drying, air drying (e.g., hot air drying, fluidized bed drying method, spray drying, drum drying, and low temperature drying), pressure drying, vacuum drying, microwave drying, and oil heat drying. In particular, a method involving air drying (e.g., hot air drying, fluidized bed drying method, spray drying, drum drying, or low temperature drying) or freeze drying is preferable in view of a small degree of change in color tone or flavor inherent in the plant and of being able to suppress the non-food aroma (e.g., burnt odor).

The "dry" state in the present disclosure indicates a state where the moisture content is approximately 20 mass % or less and the water activity value is 0.85 or less. The moisture content may be 10 mass % or less, and the water activity value may be 0.80 or less, or 0.75 or less.

In the present disclosure, the term "in terms of dry mass" refers to an equivalent value to the mass when the water content is 0 mass %.

In quantitative measurement of moisture, a moisture content based on the wet mass is measured by a method involving subjecting a powder derived from a starch-containing plant or a powdery food containing it to heat drying under reduced pressure. Specifically, an appropriate amount of a sample is placed in a scale container previously adjusted to a constant weight (W0) and is measured (W1) up to the digit of 0.1 mg. Under ordinary pressure, the scale container with the lid removed or the aperture open is put in an electric dryer that enables a constant temperature and reduced pressure, the electric dryer being adjusted to a predetermined temperature (more specifically, 90° C.). The door is closed, the vacuum pump is operated, and drying is performed at a predetermined degree of reduced pressure for a predetermined period of time. The vacuum pump is stopped, the pressure is returned to ordinary pressure by sending dry air, the scale container is taken out, the lid is put on the container, and after allowing to cool in a desiccator, the mass is weighed. The drying, cooling, and weighing the mass are repeated until a constant weight (W2, measuring up to the digit of 0.1 mg) is reached. The moisture content (mass %) is determined by the following calculation equation.

$$\text{Moisture (g/100 g)} = (W1-W2)/(W1-W0) \times 100$$

W0: mass (g) of the scale container adjusted to constant weight,

W1: mass (g) of the scale container containing a sample before drying, and

W2: mass (g) of the scale container containing the sample after drying.

The water activity value is a numerical value representing the proportion of free water in a food and is used as an indicator of the preservability of a food. Specifically, it is the value obtained by dividing the equilibrium vapor pressure (p) in the headspace on a sample by the vapor pressure (p0) of water at the same temperature, and in other words, is the value obtained by dividing the equilibrium relative humidity (ERH) in the headspace by 100. The water activity value can be measured with a general water activity measuring device (e.g., "LabMaster-aw NEO" manufactured by Novasina AG, employing an electric resistance based (electrolyte based) humidity sensor).

For the powder derived from a starch-containing plant of one or more embodiments of the present invention, the method of crushing used for pulverization is not particularly limited. The temperature at the time of crushing is also not limited, and any of high-temperature crushing, ordinary-temperature crushing, and low-temperature crushing may be performed. The pressure at the time of crushing is also not limited, and any of high-pressure crushing, ordinary-pressure crushing, and low-pressure crushing may be performed. Examples of the apparatus for such crushing include apparatuses, such as a blender, a mixer, a mill, a kneader, a grinder, a crusher, and an attritor, and any of these apparatuses may be used. As such an apparatus, for example, a medium stirring mill, such as a dry bead mill and a ball mill (a rolling type, a vibration type, etc.), a jet mill, a high-speed rotary impact type mill (e.g., pin mill), a roll mill, or a hammer mill can be used.

The powdery food containing a powder derived from a starch-containing plant of one or more embodiments of the present invention (hereinafter, may be simply referred to as the powdery food of one or more embodiments of the present invention) contains a certain amount or more of starch. Specifically, the starch content in the powdery food of one or more embodiments of the present invention may be 10 mass % or more in terms of dry mass and may be 13 mass % or more, 15 mass % or more, 18 mass % or more, or 20 mass % or more. The starch content derived from the powder derived from a starch-containing plant may be 50 mass % or more, 70 mass % or more, or 90 mass % or more, in terms of dry mass, with respect to the starch content of the whole of the powdery food of one or more embodiments of the present invention. On the other hand, although the upper limit of the starch content is not particularly limited, the content of starch in the powdery food of one or more embodiments of the present invention may be 90 mass % or less, or 80 mass % or less in terms of dry mass. In one or more embodiments of the present invention, the starch content in a powder derived from the powdery food or the starch-containing plant can be measured by, for example, a method involving removing soluble carbohydrates (e.g., glucose, maltose, and maltodextrin), which will affect the values to be found, by 80% ethanol extraction treatment according to the method of AOAC 996.11 as in "the Standard Tables of Food Composition in Japan, 2015, (Seventh Revised Version)".

The powdery food of one or more embodiments of the present invention contains a certain amount or more of dietary fibers. Specifically, the dietary fiber content in the powdery food of one or more embodiments of the present invention may be, in terms of dry mass, 1 mass % or more and may be 2 mass % or more, 3 mass % or more, 4 mass % or more, 5 mass % or more, 6 mass % or more, 7 mass % or more, 8 mass % or more, 9 mass % or more, or 10 mass % or more. The upper limit of the dietary fiber content may be 90 mass % or less, 80 mass % or less, 70 mass % or less, 60 mass % or less, or 50 mass % or less.

Furthermore, a powdery food in which the proportion of insoluble dietary fibers in the dietary fibers is a predetermined value or more is preferable for the following reason; such a powdery food easily causes a dry odor derived from the dietary fibers and, therefore, one or more embodiments of the present invention can be effectively used therefor. Specifically, the proportion of the insoluble dietary fibers in the dietary fibers may be 50 mass % or more, 60 mass % or more, or 70 mass % or more. As the method for quantitatively measuring dietary fibers, a general modified Prosky method is used in accordance with the Standard Tables of Food Composition in Japan, 2015, (Seventh Revised Version).

In one or more embodiments of the present invention, the content of the powder derived from a starch-containing plant with respect to the whole of the powdery food may be in a predetermined range. For example, the content of the powder derived from a starch-containing plant with respect to the whole of the powdery food may be 10 mass % or more in terms of dry mass and may be, in the view of suppressing dry odor and extracting sweet flavor, 30 mass % or more, 50 mass % or more, 70 mass % or more, 90 mass % or more, or 100 mass %. In a powdery food in which the content of the powder derived from a starch-containing plant with respect to the whole of the powdery food is not 100 mass %, the type of other powdery food is not limited in any way as long as the effects of one or more embodiments of the present invention are not impaired. Any powdered food material can be appropriately selected according to the desired flavor and quality for the final powdery food without any limitation on the type, the combination thereof, and the use. As such a powdered food material, for example, sodium chloride, sucrose, and dextrin can be mentioned. The starch of a starch-containing plant can be used in any state with or without gelatinization, and the degree of gelatinization of the starch may be 50% or less. The degree of gelatinization of starch can be measured by the glucoamylase second method (Japan Food Research Laboratories, https://www.jfrl.or.jp/storage/file/221.pdf).

The powdery food of one or more embodiments of the present invention may contain a certain amount or more of 2,3-butanediol (CAS. No. 513-85-9) in view of suppressing the dry odor of starch and enhancing the sweet flavor of starch. Specifically, the lower limit of the content of 2,3-butanediol may be 50 ppb or more and may be, in particular, in view of imparting the effects of one or more embodiments of the present invention, 100 ppb or more, 300 ppb or more, 500 ppb or more, 800 ppb or more, or 1,000 ppb or more. On the other hand, the upper limit of the content of 2,3-butanediol may be 40,000 ppb or less and may be, in view of the risk of occurrence of off-flavor, 30,000 ppb or less, 20,000 ppb or less, 10,000 ppb or less, 5,000 ppb or less, or 2,000 ppb or less.

The powdery food of one or more embodiments of the present invention may contain a certain amount or more of diethylene glycol monoethyl ether (CAS. No. 111-90-0) in view of suppressing the dry odor of starch and enhancing the sweet flavor of starch. Specifically, the lower limit of the content of diethylene glycol monoethyl ether may be 5 ppb or more and may be, in view of imparting the effects of one or more embodiments of the present invention, 10 ppb or more, 50 ppb or more, 100 ppb or more, 300 ppb or more, 500 ppb or more, 700 ppb or more, or 1,000 ppb or more. On the other hand, the upper limit of the content of diethylene glycol monoethyl ether may be 40,000 ppb or less and may be, in view of the risk of occurrence of off-flavor, 30,000 ppb or less, 20,000 ppb or less, 10,000 ppb or less, 8,000 ppb or less, 5,000 ppb or less, 4,000 ppb or less, 3,000 ppb or less, or 2,000 ppb or less. It is further preferable to contain both 2,3-butanediol and diethylene glycol monoethyl ether because the effect of suppressing dry odor and the effect of enhancing sweet flavor are synergistically promoted, and it is desirable that both components be contained in the respective predetermined contents.

2,3-Butanediol is known to be contained in alcoholic beverages such as domestic and foreign wine and vodka in an amount of about several to several thousand ppm. However, it is thought that 2,3-butanediol itself is odorless and has little influence on the flavor of the alcoholic beverages, and the effect of suppressing the dry odor of starch of a starch-containing plant powder and enhancing the sweet flavor of the starch has not been known at all. Furthermore, it has not been known at all that when 2,3-butanediol is used in a regulated amount together with diethylene glycol monoethyl ether, which is known to be contained in essential oils of citrus fruits such as orange and lime in an amount of about several ppm, further enhancing effects are exhibited on the effects of suppressing the dry odor of starch of a powder derived from a starch-containing plant and enhancing the sweet flavor of starch.

In one or more embodiments of the present invention, the content of 2,3-butanediol is measured in accordance with, for example, a conventional method by the following GC/MS assay.

As the method for extracting 2,3-butanediol or the like from a sample, dilution with water is performed because 2,3-butanediol has high affinity with water. As the measurement method, a full evaporation-dynamic headspace-gas chromatography-mass spectrometry (hereinafter, "FE-DHS-GCMS") method is performed, which measures water-soluble components that are not measurable by ordinary analysis by forcibly volatilizing a very small amount of a sample thoroughly by a DHS method (a dynamic extraction method by forcibly purging the volatile components in the gas phase with an inert gas and collecting the volatile components with an adsorbent). Diethylene glycol monoethyl ether is also analyzed by the same procedure. For example, a sample is well homogenized in an appropriate amount (20-fold amount) of water to extract components, the solid content is removed by, for example, filtration, a significantly small amount (0.03 g) of the residue is weighed in a 10-mL flat bottom vial, the vial is then sealed, the whole quantity of the sample is forcibly volatilized by purging with an excess amount of nitrogen gas and is adsorbed with an adsorption resin (Tenax column) according to the properties of the analytical components, the resulting resin is then treated with a heating and desorbing system to introduce to a two-dimensional gas chromatographic analyzer, and analysis is performed. In order to measure the concentration of a component in a sample, the sample and a standard sample diluted to an arbitrary concentration are analyzed to grasp the confirmation ion peak areas of both samples, and the values are compared to each other to measure the concentration of the component in the sample.

After the analysis above, a part of the sample is applied to a mass spectrometer to obtain the mass spectrum, and the retention times of both components are verified based on the related ions of each component (2,3-butanediol: 45, 57, 75, diethylene glycol monoethyl ether: 45, 59, 72).

The mass spectrometer (MS) used is a quadrupole type 5973 Mass Selective Detector (manufactured by Agilent Technologies, Inc.). Mass spectral analysis can be performed by carrying out an ionization method EI+ at an ionization potential of 70 eV, importing the results by a scan mode, and carrying out identification using ions characteristic to each component (2,3-butanediol: 45, 57, 75, diethylene glycol monoethyl ether: 45, 59, 72) as related ions, and the retention times of 2,3-butanediol and diethylene glycol monoethyl ether can be each specified by specifying the retention time in which all these related ions in the standard product are detected.

Specifically, FE-DHS-GC-MS analysis is performed under the conditions as below.
[GC-MS Condition (Full Evaporation Dynamic Headspace (FE-DHS) Injection Method)]
  Apparatus: 7890B (GC) and 5977B (MS) manufactured by Agilent Technologies, Inc., and MultiPurpose Sampler (auto-sampler) manufactured by Gerstel Gmbh & Co., KG
  Adsorption resin: TENAX
  Incubation temperature: 80° C.
  Nitrogen gas purge volume: 3 L
  Nitrogen gas purge flow rate: 100 mL/min
  TDU: [30° C.]-[210° C./min]-[240° C. (3 min)]
  CIS: [10° C.]-[120° C./see]-[240° C.] (liner filler: TENAX)
  Column: DB-WAX (30 m×250 μm×0.25 μm) manufactured by Gerstel GmbH & Co., KG
  Column temperature: [40° C. (3 min)]-[5° C./min]-[240° C. (7 min)]
  Carrier gas: He
  Transfer line: 250° C.
  Ion source temperature: 230° C.
  Scan Parameter: m/z=from 28.7 to 300
  Split: none Under the conditions above, authentic preparations of 2,3-butanediol and diethylene glycol monoethyl ether (manufactured by Tokyo Chemical Industry Co., Ltd.) having known concentrations are diluted with water to appropriate concentrations, and the diluted products and a sample are subjected to analysis. The component in the sample can be quantitatively measured by comparison with the retention time of the standard product through analysis based on a mass spectral pattern by a mass spectrometer, although there is some deviation in accordance with the measurement conditions, and by comparison of the amounts of confirmation ions (45 in both 2,3-butanediol and diethylene glycol monoethyl ether) between the diluted authentic preparations and the sample in or around the retention time of the peak that seems to be the target component (for example, around a retention time of 24.6 minutes for 2,3-butanediol, and around a retention time of 24.3 minutes for diethylene glycol monoethyl ether).

It is particularly preferable to half-cut the area near the retention time of a peak that seems to be the target component (for example, from 23 to 27.3 minutes) and implement two-dimensional gas chromatography with columns of different properties, because the concentration of the component can be more exactly quantitatively measured. In the two-dimensional gas chromatography measurement under the conditions, it can be judged by comparison with the retention time of the standard product, for example, that a peak around a retention time of 29.0 minutes is of 2,3-butanediol and a peak around a retention time of 30.2 minutes is of diethylene glycol monoethyl ether, though there is some deviation in accordance with the measurement conditions.

Specifically, the two-dimensional gas chromatography can be performed under the following conditions.
[Two-Dimensional GC-MS Conditions]
  CTS: [−150° C.]-[20° C./sec]-[250° C.]
  Column: DB-5 (10 m×180 μm×0.4 μm) manufactured by Gerstel GmbH & Co., KG
  Column temperature: [40° C. (0 min)]-[40° C./min]-[240° C. (15 min)]
  Carrier gas: He In addition, the powdery food of one or more embodiments of the present invention can contain a significantly small amount of a component, such as N-acetyl-L-methionine (CAS. No. 65-82-7) or kaempferol-3-glucoside (CAS. No. 480-10-4), which is known to be generally contained in plants, in view of enhancing the effects of one or more embodiments of the present invention. When the component is contained in the powdery food of one or more embodiments of the present invention, the concentration of N-acetyl-L-methionine or kaempferol-3-glucoside may be from 0.01 ppm to 2.0 ppm, and it is further preferable to contain both components.

For 2,3-butanediol in one or more embodiments of the present invention, a pure form thereof or a composition containing it may be allowed to be contained in the powdery food, and when the powdery food of one or more embodiments of the present invention is served for eating or drinking, the component such as 2,3-butanediol may be derived from the food or drink and may be derived from a plant. The same is applied to diethylene glycol monoethyl ether.

In one or more embodiments of the present invention, the particle size d50 of a powdery food after ultrasonication is a predetermined value or less in view of suppressing the dry odor of starch and enhancing the sweet flavor of starch. Specifically, the particle size d50 may be usually 1,000 μm or less and may be, in particular, 600 μm or less, 200 μm or less, or 100 μm or less.

The particle size d50 of a powdery food is defined as the particle size at which the ratio between the proportion of the cumulative value of particle frequency in % on the large side and the proportion of the cumulative value of particle frequency in % on the small side is 50:50 when the particle size distribution of the powdery food is divided into two from a certain particle size. The particle size d50 of a powdery food can be measured using, for example, a laser diffraction particle size distribution analyzer described below. The term "particle size" herein refers to that measured on a volume basis unless otherwise specified.

The conditions for measuring the particle size d50 of the powdery food of one or more embodiments of the present invention are as follows. First, the solvent used at the time of measurement is ethanol, which hardly affects the structure of the powdery food. The laser diffraction particle size distribution analyzer used for the measurement is a laser diffraction particle size distribution analyzer having a measurement range of at least from 0.02 to 2,000 μm by a laser diffraction scattering method. For example, Microtrac MT3300 EXII system of MicrotracBEL Corporation is used, and as the measurement application software, for example, DMS2 (Data Management System version 2, MicrotracBEL Corporation) can be used. When the measurement apparatus and the software above are used, measurement may be performed by pressing the wash button of the software to implement washing, pressing the set zero button of the software to implement zero adjustment, and directly charging a sample by sample loading until the concentration of the sample falls within an appropriate range. When a sample after disturbance, i.e., an ultrasonicated sample is subjected to the measurement, a previously ultrasonicated sample may be put, or a sample may be put and then ultrasonicated using the above-mentioned measurement apparatus, followed by the measurement. In the latter case, a sample not subjected to ultrasonication is put, the concentration is adjusted in an appropriate range by sample loading, and the ultrasonication button of the software is then pressed down to perform ultrasonication. Subsequently, defoaming is performed three times, and then sample loading is performed again. Immediately after verification that the concentration is still in the appropriate range, laser diffraction is performed at a flow rate of 60% for a measurement time of 10 seconds, and the result can be used as the measured value. In the present disclosure, the "ultrasonication" is treatment by applying ultrasonic waves having a frequency of 40 kHz to a measurement sample at an output of 40 W for 3 minutes, unless otherwise specified. The parameters at the time of measurement are, for example, distribution display: volume, particle refractive index: 1.60, solvent refractive index: 1.36, upper limit of measurement (μm)=2,000.00 μm, and lower limit of measurement (μm)=0.021 μm.

In the determination of the particle size d50 after ultrasonication of the powdery food of one or more embodiments of the present invention, it is preferable to measure the particle size distribution at each channel (CH) and then determine the d50 using the particle size for each measurement channel shown in Table 1 below as the standard. Specifically, the particle frequency in % of each channel (which is also referred to as "particle frequency in % for XX channel") can be determined by measuring the frequency of particles that are not larger than the particle size specified for each of the channels shown in Table 1 below and larger than the particle size (in the channel largest in the measurement range, measurement lower limit of particle size) specified for the channel of a larger number by one for each channel shown in Table 1 and using the total frequency of all channels in the measurement range as the denominator. For example, the particle frequency in % of channel 1 represents the frequency in % of particles having sizes of 2,000.00 μm or less and higher than 1,826.00 μm.

TABLE 1

| Channel | Particle size (μm) |
|---|---|
| 1 | 2000.000 |
| 2 | 1826.000 |
| 3 | 1674.000 |
| 4 | 1535.000 |
| 5 | 1408.000 |
| 6 | 1291.000 |
| 7 | 1184.000 |
| 8 | 1086.000 |
| 9 | 995.600 |
| 10 | 913.000 |
| 11 | 837.200 |
| 12 | 767.700 |
| 13 | 704.000 |
| 14 | 645.600 |
| 15 | 592.000 |
| 16 | 542.900 |
| 17 | 497.800 |
| 18 | 456.500 |
| 19 | 418.600 |
| 20 | 383.900 |
| 21 | 352.000 |
| 22 | 322.800 |
| 23 | 296.000 |
| 24 | 271.400 |
| 25 | 248.900 |
| 26 | 228.200 |
| 27 | 209.300 |
| 28 | 191.900 |
| 29 | 176.000 |
| 30 | 161.400 |
| 31 | 148.000 |
| 32 | 135.700 |
| 33 | 124.500 |
| 34 | 114.100 |
| 35 | 104.700 |
| 36 | 95.960 |
| 37 | 88.000 |
| 38 | 80.700 |
| 39 | 74.000 |
| 40 | 67.860 |
| 41 | 62.230 |
| 42 | 57.060 |
| 43 | 52.330 |
| 44 | 47.980 |
| 45 | 44.000 |
| 46 | 40.350 |
| 47 | 37.000 |
| 48 | 33.930 |
| 49 | 31.110 |

TABLE 1-continued

| Channel | Particle size (μm) |
|---|---|
| 50 | 28.530 |
| 51 | 26.160 |
| 52 | 23.990 |
| 53 | 22.000 |
| 54 | 20.170 |
| 55 | 18.500 |
| 56 | 16.960 |
| 57 | 15.560 |
| 58 | 14.270 |
| 59 | 13.080 |
| 60 | 12.000 |
| 61 | 11.000 |
| 62 | 10.090 |
| 63 | 9.250 |
| 64 | 8.482 |
| 65 | 7.778 |
| 66 | 7.133 |
| 67 | 6.541 |
| 68 | 5.998 |
| 69 | 5.500 |
| 70 | 5.044 |
| 71 | 4.625 |
| 72 | 4.241 |
| 73 | 3.889 |
| 74 | 3.566 |
| 75 | 3.270 |
| 76 | 2.999 |
| 77 | 2.750 |
| 78 | 2.522 |
| 79 | 2.312 |
| 80 | 2.121 |
| 81 | 1.945 |
| 82 | 1.783 |
| 83 | 1.635 |
| 84 | 1.499 |
| 85 | 1.375 |
| 86 | 1.261 |
| 87 | 1.156 |
| 88 | 1.060 |
| 89 | 0.972 |
| 90 | 0.892 |
| 91 | 0.818 |
| 92 | 0.750 |
| 93 | 0.688 |
| 94 | 0.630 |
| 95 | 0.578 |
| 96 | 0.530 |
| 97 | 0.486 |
| 98 | 0.446 |
| 99 | 0.409 |
| 100 | 0.375 |
| 101 | 0.344 |
| 102 | 0.315 |
| 103 | 0.289 |
| 104 | 0.265 |
| 105 | 0.243 |
| 106 | 0.223 |
| 107 | 0.204 |
| 108 | 0.187 |
| 109 | 0.172 |
| 110 | 0.158 |
| 111 | 0.145 |
| 112 | 0.133 |
| 113 | 0.122 |
| 114 | 0.111 |
| 115 | 0.102 |
| 116 | 0.094 |
| 117 | 0.086 |
| 118 | 0.079 |
| 119 | 0.072 |
| 120 | 0.066 |
| 121 | 0.061 |
| 122 | 0.056 |
| 123 | 0.051 |
| 124 | 0.047 |
| 125 | 0.043 |
| 126 | 0.039 |
| 127 | 0.036 |
| 128 | 0.033 |
| 129 | 0.030 |
| 130 | 0.028 |
| 131 | 0.026 |
| 132 | 0.023 |

The powdery food of one or more embodiments of the present invention can be manufactured by subjecting a dried starch-containing plant having a predetermined starch content or more to crushing such that the particle size d50 after ultrasonication is a predetermined value or less and allowing the powdery food to have a predetermined content of 2,3-butanediol and/or diethylene glycol monoethyl ether. Details are as described above. For incorporating 2,3-butanediol and/or diethylene glycol monoethyl ether, 2,3-butanediol and/or diethylene glycol monoethyl ether in a pure form or a composition containing 2,3-butanediol and/or diethylene glycol monoethyl ether may be added to or mixed with a powder of a plant before drying, or added to or mixed with a dried plant after drying and before crushing, followed by crushing, or added to or mixed with a powdery food. As described above, regarding the powdery food of one or more embodiments of the present invention, the composition containing 2,3-butanediol and/or diethylene glycol monoethyl ether may be a foodstuff and may be derived from a plant.

One or more embodiments of the present invention also include a method for enhancing the sweet flavor of starch of a powdery food, the method including adding a predetermined amount of 2,3-butanediol and/or diethylene glycol monoethyl ether to a dried and crushed product of a starch-containing plant having a predetermined starch content or more and a predetermined value or less of a particle size d50 after ultrasonication. Details are as described above. As described above, the dry odor of starch is reduced and the characteristic sweet flavor of starch inherent in a plant is further enhanced by incorporating 2,3-butanediol and/or diethylene glycol monoethyl ether in certain ranges of their respective contents to a powdery food having a predetermined starch content or more and a predetermined value or less of particle size d50 after ultrasonication.

One or more embodiments of the present invention also encompass a food/drink containing the above-described powdery food of a starch-containing plant. Specifically, in a food/drink containing a powdery food, the dry odor thereof can be suppressed, and the pleasant flavor of an edible plant having enhanced sweet flavor characteristic to the plant can be imparted to the food/drink, by the effects of the powdery food of one or more embodiments of the present invention, whereby the flavor of the food/drink can be improved. The amount of the powdery food of one or more embodiments of the present invention contained in the food/drink is not particularly limited and may be appropriately adjusted such that the flavor of the edible plant as the raw material of the powdery food can be given to the food/drink. The proportion of the dry weight of the edible plant with respect to the total amount of the food/drink may be 10 mass % or more, 20 mass % or more, 30 mass % or more, or 40 mass % or more. The upper limit may be 100 mass % or less.

The powdery food of one or more embodiments of the present invention may contain another foodstuff as long as it does not interfere with the function and effect of one or more embodiments of the present invention. Specifically, such a foodstuff is a foodstuff or ingredient larger than 2,000 μm (2 mm), which is not the target of laser diffraction particle size distribution measurement. Examples thereof include grain puffs, dried nuts, and dried fruits, and any thereof may be used. These foodstuffs may be used alone or in an arbitrary combination of two or more thereof.

In such a case, the 50% integrated diameter after ultrasonication is measured after removing, from the ingredients, those having a diameter of the measurement upper limit, 2,000.00 μm or more.

Examples of the food/drink containing the powdery food of one or more embodiments of the present invention include, but not limited to, liquid foods such as beverages (e.g., soup and smoothie), liquid, semi-solid, or solid food/drink such as seasonings (e.g., mayonnaise, dressing, butter, and margarine), semi-solid or solid foods such as confectioneries (e.g., granola, sticks, crackers, caramel, gummies, and chips), and food/drink such as dry seasonings.

Accordingly, one or more embodiments of the present invention also encompass a method for manufacturing a food/drink containing a powdery food having a particle size d50 of 1,000 μm or less after ultrasonication, the method comprising crushing an edible plant having a dietary fiber content of 5 mass % or more in terms of dry mass and allowing the powdery food to contain 50 ppb or more and 40,000 ppb or less of 2,3-butanediol and/or 5 ppb or more and 40,000 ppb or less of diethylene glycol monoethyl ether. One or more embodiments of the present invention also encompass a method for manufacturing a food/drink containing a powdery food, the method including crushing an edible plant having a dietary fiber content of 5 mass % or more in terms of dry mass and allowing the powdery food to contain 50 ppb or more and 40,000 ppb or less of 2,3-butanediol and 5 ppb or more and 40,000 ppb or less of diethylene glycol monoethyl ether. In the above manufacturing methods, 2,3-butanediol and/or diethylene glycol monoethyl ether can be added at an arbitrary timing during the process of manufacturing a food/drink. Details are as described above. One or more embodiments of the present invention can be used for bringing out sweet flavor also in a powdery food that has not been dried and therefore does not need to control dry odor; however, since one or more embodiments of the present invention exhibit effects of easily controlling the dry odor of starch and bringing out sweet flavor characteristic to starch, one or more embodiments of the present invention can be more suitably used in a food/drink containing the powdery food.

Furthermore, One or more embodiments of the present invention also encompass a method for bringing out the sweet flavor of a food/drink containing a powdery food having a particle size d50 of 1,000 μm or less after ultrasonication and a method for controlling the dry odor of starch, the methods including crushing an edible plant and allowing the powdery food to contain 50 ppb or more and 40,000 ppb or less of 2,3-butanediol and/or 5 ppb or more and 40,000 ppb or less of diethylene glycol monoethyl ether. One or more embodiments of the present invention further encompass a method for controlling the dry odor of a food/drink containing a powdery food and a method for enhancing the sweet flavor characteristic to a plant, the methods including crushing an edible plant and allowing the powdery food to contain 50 ppb or more and 40,000 ppb or less of 2,3-butanediol and 5 ppb or more and 40,000 ppb or less of diethylene glycol monoethyl ether. In the above-described methods, 2,3-butanediol and/or diethylene glycol monoethyl ether can be added to the food/drink at an arbitrary timing. Details are as described above. One or more embodiments of the present invention can be used for bringing out sweet flavor also in a powdery food that has not been dried and therefore does not need controlling dry odor; however, since one or more embodiments of the present invention exhibit effects of easily controlling the dry odor of starch and bringing out sweet flavor characteristic to starch, one or more embodiments of the present invention can be more suitably used in a food/drink containing the powdery food.

EXAMPLES

One or more embodiments of the present invention will now be described in more detail with reference to Examples, but these Examples are illustrative only for convenience of description, and one or more embodiments of the present invention are not limited to these Examples in any sense.

As shown in Tables 2 and 3, dried powders of pumpkin, sweet potato, corn, and lotus root were selected as starch-containing plants. 2,3-Butanediol and/or diethylene glycol monoethyl ether in pure form (manufactured by Tokyo Chemical Industry Co., Ltd.) was diluted with water to an appropriate concentration and was added to and mixed with the powders, and the resultant was adjusted to have certain contents thereof (1 mL of water (control) or a dilution of diethylene glycol monoethyl ether adjusted to an appropriate concentration was added to 10 g of a dried powder derived from a starch-containing plant, followed by well mixing. The concentration of 2,3-butanediol and/or diethylene glycol monoethyl ether was adjusted in terms of content with respect to the powdery food).

The food/drink (smoothie) of Test Example 53 was prepared by mixing 10 mass % of a dried powder of corn with water, filling a 180-mL glass bottle with 150 mL of this mixture, sterilizing the bottle in a hot water bath (temperature reached: 60° C.), cooling, and performing capping. The concentrations of 2,3-butanediol and diethylene glycol monoethyl ether in the dried plant powder of corn were previously adjusted to the values shown in Table 4 according to the above-described method.

The particle size d50 after ultrasonication, the starch content, and the insoluble dietary fiber content were measured under the above-mentioned preferable conditions. Subsequently, these powdery foods (dried powders) and the food/drink (smoothie) were subjected to sensory inspection for the effect of reducing the dry odor of starch, the effect of enhancing the sweet flavor of starch, and comprehensive evaluation. Furthermore, powdery foods were produced by mixing the sample of Test Example 25 and sodium chloride at the proportions shown in the table and were verified whether the effects of one or more embodiments of the present invention were exhibited or not.

The evaluation criteria are as follows.

<Evaluation Criterion No. 1: Dry Odor of Starch>
  5: Superior because dry odor of starch is not perceived at all;
  4: Slightly superior because almost no dry odor of starch is perceived;
  3: Dry odor of starch is perceived but at an acceptable level;
  2: Slightly inferior because dry odor of starch is slightly strongly perceived; and
  1: Inferior sense dry odor of starch is strongly perceived.

Here, dry odor was evaluated in terms of unpleasant offensive odor that fresh edible plants do not inherently have, such as a fishy or earthy odor.

<Evaluation Criterion No. 2: Sweet Flavor Derived from Starch>
5: Superior because sweet flavor derived from starch is strongly sensed;
4: Slightly superior because sweet flavor derived from starch is slightly strongly perceived;
3: Acceptable because sweet flavor derived from starch is perceived;
2: Slightly inferior because sweet flavor derived from starch is hardly perceived; and
1: Inferior because sweet flavor derived from starch is not perceived.

Here, sweet flavor derived from starch was evaluated in terms of a preferable sweet taste or a sweet aroma reminding it that fresh edible plants inherently have or obviously produce when cooked.

<Evaluation Criterion No. 3: Comprehensive Evaluation>
5: Superior because original flavor of starch-containing plant is strong;
4: Slightly superior because original flavor of starch-containing plant is slightly strong;
3: Acceptable because original flavor of starch-containing plant is sensed;
2: Slightly inferior because original flavor of starch-containing plant is somewhat weak; and
1: Inferior because original flavor of starch-containing plant is weak.

The sensory inspectors were chosen from inspectors who had received training for the following discrimination tests A) to C) and showed particularly excellent results, had experience in product development and a wealth of knowledge about the quality of foods, such as taste and texture, and were capable of performing absolute evaluation on each sensory inspection item.

A) Taste quality discrimination test of correctly discriminating samples for five tastes (sweetness: taste of sugar, sourness: taste of tartaric acid, savoriness: taste of sodium glutamate, saltiness: taste of sodium chloride, and bitterness: taste of caffeine) from aqueous solutions produced so as to have a concentration close to the threshold of each component and two samples of distilled water, seven samples in total;

B) Concentration difference discrimination test of correctly discriminating concentration differences in five sodium chloride aqueous solutions and five acetic acid aqueous solutions having concentrations slightly different from each other; and C) Triangle discrimination test of correctly discriminating a soy sauce of maker B from two soy sauces of maker A and the soy sauce of maker B, three samples in total.

In each of the evaluation items, all the inspectors evaluated standard samples in advance, and each score of the evaluation criteria was standardized. The sensory inspection was then performed with objectivity by 10 inspectors. The evaluation of the each item was made by selecting a rating closest to the inspector's own evaluation in five-grade scale of each item. The total result of the evaluation was calculated from the arithmetic mean values of the scores by 10 inspectors.

The results are shown in Tables 2, 3 and 4.

TABLE 2

| | Raw material of powder | Particle size after ultrasonication d50 (μm) | Starch (g/100 g) | Insoluble dietary fiber (g/100 g) | 2,3-Butanediol (ppb) | Diethylene glycol monoethyl ether (ppb) | Sensory inspection Dry odor of starch | Sweet aroma of starch | Comprehensive evaluation |
|---|---|---|---|---|---|---|---|---|---|
| Comparative Example 1 | Pumpkin | 1104.4 | 13.3 | 9.0 | 300 | | 1 | 1 | 1 |
| Comparative Example 2 | Pumpkin | 87 | 25.4 | 7.7 | 40 | | 1 | 1 | 1 |
| Test Example 1 | | | | | 50 | | 4 | 4 | 4 |
| Test Example 2 | | | | | 100 | | 4 | 4 | 5 |
| Test Example 3 | | | | | 500 | | 4 | 5 | 5 |
| Test Example 4 | | | | | 1000 | | 5 | 5 | 5 |
| Test Example 5 | | | | | 5000 | | 5 | 5 | 5 |
| Test Example 6 | | | | | 10000 | | 5 | 5 | 5 |
| Test Example 7 | | | | | 20000 | | 5 | 5 | 5 |
| Test Example 8 | | | | | 30000 | | 5 | 5 | 4 |
| Test Example 9 | | | | | 40000 | | 5 | 4 | 3 |
| Comparative Example 3 | Pumpkin | 87 | 25.4 | 7.7 | | 3 | 1 | 1 | 1 |
| Test Example 10 | | | | | | 5 | 4 | 4 | 4 |
| Test Example 11 | | | | | | 10 | 4 | 4 | 5 |
| Test Example 12 | | | | | | 50 | 4 | 5 | 5 |
| Test Example 13 | | | | | | 100 | 5 | 5 | 5 |
| Test Example 14 | | | | | | 300 | 5 | 5 | 5 |
| Test Example 15 | | | | | | 500 | 5 | 5 | 5 |
| Test Example 16 | | | | | | 700 | 5 | 5 | 5 |
| Test Example 17 | | | | | | 1000 | 5 | 5 | 5 |

TABLE 2-continued

| | Raw material of powder | Particle size after ultrasonication d50 (μm) | Starch (g/100 g) | Insoluble dietary fiber (g/100 g) | 2,3-Butanediol (ppb) | Diethylene glycol monoethyl ether (ppb) | Sensory inspection Dry odor of starch | Sweet aroma of starch | Comprehensive evaluation |
|---|---|---|---|---|---|---|---|---|---|
| Test Example 18 | | | | | | 2000 | 5 | 5 | 5 |
| Test Example 19 | | | | | | 3000 | 5 | 5 | 5 |
| Test Example 20 | | | | | | 4000 | 5 | 5 | 5 |
| Test Example 21 | | | | | | 20000 | 5 | 5 | 4 |
| Test Example 22 | | | | | | 30000 | 5 | 5 | 4 |
| Test Example 23 | | | | | | 40000 | 5 | 4 | 3 |
| Test Example 24 | | | | | 50 | 2000 | 5 | 5 | 5 |
| Test Example 25 | | | | | 1000 | 100 | 5 | 5 | 5 |
| Test Example 26 | | | | | 30000 | 10 | 5 | 5 | 5 |
| Comparative Example 4 | Corn | 1203.3 | 71 | 8.3 | 100 | 200 | 2 | 3 | 2 |
| Test Example 27 | Corn | 14.18 | 66 | 8.8 | 50 | 5 | 4 | 4 | 4 |
| Test Example 28 | | | | | 100 | 10 | 5 | 5 | 5 |
| Test Example 29 | | | | | 500 | 50 | 5 | 5 | 5 |
| Test Example 30 | | | | | 1000 | 100 | 5 | 5 | 5 |
| Test Example 31 | | | | | 5000 | 300 | 5 | 5 | 5 |
| Test Example 32 | | | | | 10000 | 500 | 5 | 5 | 5 |
| Test Example 33 | | | | | 20000 | 700 | 5 | 4 | 5 |
| Test Example 34 | | | | | 30000 | 1000 | 5 | 5 | 5 |
| Test Example 35 | | | | | 40000 | 2000 | 5 | 5 | 5 |
| Test Example 36 | | | | | 40000 | 5000 | 5 | 5 | 5 |
| Test Example 37 | Corn | 9.11 | 74.6 | 40 | 1000 | 100 | 5 | 5 | 5 |
| Test Example 38 | Sweet potato | 24.91 | 55.2 | 3.6 | 100 | | 5 | 5 | 4 |
| Test Example 39 | | | | | 100 | | 5 | 5 | 4 |
| Test Example 40 | | | | | 500 | 500 | 5 | 5 | 5 |
| Test Example 41 | Lotus root | 52.05 | 36.8 | 6.3 | 1000 | | 5 | 5 | 4 |
| Test Example 42 | | | | | | 1000 | 5 | 5 | 5 |
| Test Example 43 | | | | | 2000 | 100 | 5 | 5 | 5 |

TABLE 3

| | Raw material of powder | Proportion of starch-containing plant mass % | Sensory inspection Dry odor of starch | Sweet aroma of starch | Comprehensive evaluation |
|---|---|---|---|---|---|
| Test Example 44 | Test Example 25 + sodium chloride | 90.0 | 5 | 5 | 5 |
| Test Example 45 | | 80.0 | 5 | 5 | 5 |
| Test Example 46 | | 70.0 | 5 | 5 | 5 |

TABLE 3-continued

|  | Raw material of powder | Proportion of starch-containing plant mass % | Sensory inspection | | |
|---|---|---|---|---|---|
|  |  |  | Dry odor of starch | Sweet aroma of starch | Comprehensive evaluation |
| Test Example 47 |  | 60.0 | 5 | 5 | 5 |
| Test Example 48 |  | 50.0 | 5 | 5 | 5 |
| Test Example 49 |  | 40.0 | 5 | 5 | 5 |
| Test Example 50 |  | 30.0 | 5 | 5 | 4 |
| Test Example 51 |  | 20.0 | 5 | 5 | 4 |
| Test Example 52 |  | 10.0 | 5 | 5 | 4 |

TABLE 4

| | | Particle size | | | | Diethylene | Sensory inspection | | |
|---|---|---|---|---|---|---|---|---|---|
| | Raw material of powder | Form of food/drink | after ultrasonication d50 (μm) | Starch (g/100 g) | Dietary fiber (g/100 g) | 2,3-Butanediol (ppb) | glycol monoethyl ether (ppb) | Dry odor of starch | Sweet aroma of starch | Comprehensive evaluation |
| Test Example 53 | Corn | Smoothie | 14.18 | 10 | 3 | 100 | 10 | 5 | 5 | 5 |

As a result, it was revealed that in various powdery foods containing starch at a predetermined proportion or more, the effects of one or more embodiments of the present invention of suppressing the dry odor of starch and enhancing the sweet flavor of starch are exhibited by adjusting, for example, the 2,3-butanediol content and/or diethylene glycol monoethyl ether content and the particle size d50 after ultrasonication in predetermined ranges. It was also demonstrated that it is more preferable to adjust both the 2,3-butanediol content and the diethylene glycol monoethyl ether content in predetermined ranges because the effects of one or more embodiments of the present invention are more strongly shown. In addition, it was demonstrated that the content of the powder derived from a starch-containing plant with respect to the whole of the powdery food may be in a predetermined range. The same evaluation was performed for test plots in which, in addition to 2,3-butanediol and diethylene glycol monoethyl ether, 0.2 ppm of N-acetyl-L-methionine and 0.2 ppm of kaempferol-3-glucoside were further added to the sample of Test Example 25 or 0.01 ppm of N-acetyl-L-methionine and 0.01 ppm of kaempferol-3-glucoside were added to the sample of Test Example 25, and it was confirmed that in these case, the effects of one or more embodiments of the present invention were enhanced compared to the results of Test Example 25.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

The invention claimed is:

1. A powdery food comprising a powder derived from a starch-containing plant, the powdery food satisfying following characteristics (1) to (4):
   (1) the powdery food has a starch content of 10 mass % or more in terms of dry mass, wherein the dry mass is an equivalent value to the mass when the water content is 0 mass %;
   (2) the powdery food has a dietary fiber content of 1 mass % or more in terms of dry mass, wherein the dry mass is an equivalent value to the mass when the water content is 0 mass %;
   (3) the powdery food has a particle size d50 of 1,000 μm or less; and
   (4) the powdery food has a 2,3-butanediol content of from 50 ppb to 40,000 ppb and a diethylene glycol monoethyl ether content of from 5 ppb to 40,000 ppb,
   wherein the starch-containing plant is one or more plants selected from the group consisting of pumpkins, sweet potatoes, and lotus roots.

2. The powdery food according to claim 1, wherein the powdery food has a 2,3-butanediol content of from 50 ppb to 2,000 ppb.

3. The powdery food according to claim 1, wherein the powdery food has a content of the powder derived from the starch-containing plant of 100 mass %.

4. The powdery food according to claim 1, wherein the powdery food has a content of starch derived from the powder derived from the starch-containing plant of 50 mass % or more with respect to the whole of the powdery food.

5. A food comprising the powdery food according to claim 1.

6. A drink comprising the powdery food according to claim 1.

7. A method for manufacturing the powdery food according to claim 1, the method comprising a step of crushing a starch-containing dried plant having a moisture content of 20 mass % or less.

8. The powdery food according to claim 1, wherein the powdery food consists essentially of the powder derived from the starch-containing plant.

9. The powdery food according to claim 8, wherein the powdery food has a particle size d50 of 100 μm or less.

10. A powdery food consisting essentially of a powder derived from a starch-containing plant selected from the group consisting of pumpkins, sweet potatoes, and lotus roots, and the powdery food satisfies the following characteristics (1) to (4):

(1) the powdery food has a starch content of 10 mass % or more in terms of dry mass, wherein the dry mass is an equivalent value to the mass when the water content is 0 mass %;

(2) the powdery food has a dietary fiber content of 1 mass % or more in terms of dry mass, wherein the dry mass is an equivalent value to the mass when the water content is 0 mass %;

(3) the powdery food has a particle size d50 of 1,000 μm or less; and (4) the powdery food has a 2,3-butanediol content of from 50 ppb to 2,000 ppb and a diethylene glycol monoethyl ether content of from 5 ppb to 40,000 ppb.

11. The powdery food according to claim 10, wherein the powdery food has a content of the powder derived from the starch-containing plant of 100 mass %.

* * * * *